United States Patent [19]
Topar

[11] Patent Number: 6,082,755
[45] Date of Patent: Jul. 4, 2000

[54] TRAILER TOWBAR ADAPTOR FOR A HAND TRUCK

[76] Inventor: William M. Topar, 4664 W. Puget Ave., Glendale, Ariz. 85302

[21] Appl. No.: 09/120,904

[22] Filed: Jul. 22, 1998

Related U.S. Application Data

[60] Provisional application No. 60/053,629, Jul. 24, 1997.

[51] Int. Cl.[7] .................................. B60D 1/06; B60D 1/07
[52] U.S. Cl. .................................. 280/416.1; 280/491.5; 280/511; 280/47.27
[58] Field of Search .................................. 280/511, 47.27, 280/47.2, 47.18, 514, 47.28, 47.29, 47.11, 47.131, 415.1, 416.1, 491.5

[56] References Cited

U.S. PATENT DOCUMENTS

| | | |
|---|---|---|
| 363,940 | 5/1887 | Ash . |
| 1,150,964 | 8/1915 | Phelps . |
| 2,723,130 | 11/1955 | Andrews . |
| 3,189,365 | 6/1965 | Blacher . |
| 3,350,797 | 11/1967 | Dassinger et al. . |
| 3,622,181 | 11/1971 | Smith . |
| 4,204,701 | 5/1980 | Oltrogge .................................. 280/500 |
| 4,468,046 | 8/1984 | Rutherford .................................. 280/416 |
| 4,566,708 | 1/1986 | Specie .................................. 280/659 |
| 4,721,319 | 1/1988 | Dale . |
| 4,799,698 | 1/1989 | Markovic .................................. 180/19.1 |
| 4,883,285 | 11/1989 | Hohrman .................................. 280/491.5 |

FOREIGN PATENT DOCUMENTS

| | | | |
|---|---|---|---|
| 66156 | 8/1975 | Australia .................................. 280/511 |
| 895922 | 2/1945 | France .................................. 280/511 |
| 2218711 | 10/1973 | Germany .................................. 280/511 |
| 2456444 | 8/1976 | Germany .................................. 280/511 |
| 2838156 | 3/1980 | Germany .................................. 280/511 |
| 9115374 | 10/1991 | WIPO .................................. 280/511 |

OTHER PUBLICATIONS

Delhitch brochure, undated. However, note the "patent pending".

*Primary Examiner*—Anne Marie Boehler
*Attorney, Agent, or Firm*—Frank J. McGue

[57] ABSTRACT

An adaptor is disclosed for use in connection with a hand truck to engage a trailer. The adaptor comprises a support piece and at least one slot mounted on the support piece. The at least one slot has an open end which is adapted to engage a load bearing platform of a hand truck. A tow bar is mounted on the inside of the support piece and extends upwardly at an angle from the inside of the support piece. The tow bar engages a coupler on a trailer.

3 Claims, 8 Drawing Sheets

TRAILER TOWBAR ADAPTOR FOR A HAND TRUCK

RELATED APPLICATION

This is a continuation of provisional application Ser. No. 60/053,629 filed on Jul. 24, 1997.

TECHNICAL FIELD

This invention relates in general to hand trucks or dollys, and, more particularly, to an adaptor which allows a user to maneuver a trailer using a hand truck or dolly.

BACKGROUND OF THE INVENTION

Many trailers 2 are in use today which permit a motor vehicle to tow loads. Such trailers 2 include boat trailers as well as cargo carrying trailers. Trailers 2 generally comprise a load bearing trailer frame 4 mounted on a wheeled axle 6. Extending forwardly from trailer frame 4 is a coupler 8. Moving trailers 2 is accomplished by engaging coupler 8 on trailer 2 to a mating ball mount (not shown) on the motor vehicle. Often a jack stand 9 is optionally provided proximate to coupler 8 to allow a user to raise coupler 8 high enough to engage the ball mount on a motor vehicle. However, often times a user is desirous of moving trailers 2 manually for purposes of storing or moving from storage in areas where a motor vehicle cannot be employed.

Hand trucks are well known in the art as devices for movement of heavy objects such as appliances, boxes and the like. As best seen in FIG. 1, a typical hand truck 10 comprises a planar load bearing platform 12 which extends laterally outward from an elongated frame 14. An axle 16 supporting two wheels 18 is mounted at the point where platform 12 and frame 14 are joined. A user employs frame 14 as leverage to pivot truck 10 about axle 16 to lift loads (not shown) supported on platform 12. There are several adaptions whereby hand truck devices are used to move objects other than boxes and appliances. For example, trailer dollys provide a permanent ball mount for use with pulling trailers.

Other examples included U.S. Pat. No. 2,723,130 entitled "Wheeled Support for Outboard Motors" which issued on Nov. 8, 1955 to Andrews discloses a hand truck which may be used as a boat dolly. A stiffening bar 20, which supports a ball 28, is removably mounted. Sockets 22 and 24 are welded to support members 16 and 18. Stiffening bar 20 is received in these sockets. However, it should be noted that Andrews requires the permanent attachment of sockets to the hand truck in question.

U.S. Pat. No. 3,350,797 entitled "Set of Interchangeable Utility Apparatus" which issued on Nov. 7, 1967 to Dassinger et al. shows, in FIGS. 7–11, an attachment to a hand truck in which sleeves 80, 81 are slipped over tines 39, 40 for means of mounting the attachment.

U.S. Pat. No. 1,150,964 entitled "Hand Truck" which issued on Aug. 24, 1915 to Phelps is of more general interest in showing an extension platform 18 which may be attached to socket members 10.

None of the known prior art disclose the adaptor set forth herein.

SUMMARY OF THE INVENTION

It is an object of this invention to provide a simple adaptor for use with hand trucks to allow manual movement of trailers.

It is a further object of this invention to provide a removable adaptor for use with hand trucks which allows manual movement of trailers.

It is still another object of this invention to provide a simple, removable adaptor which can be utilized with different trailer configurations.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawings in which.

DESCRIPTION OF THE PREFERRED EMBODIMENT

Figure 2:
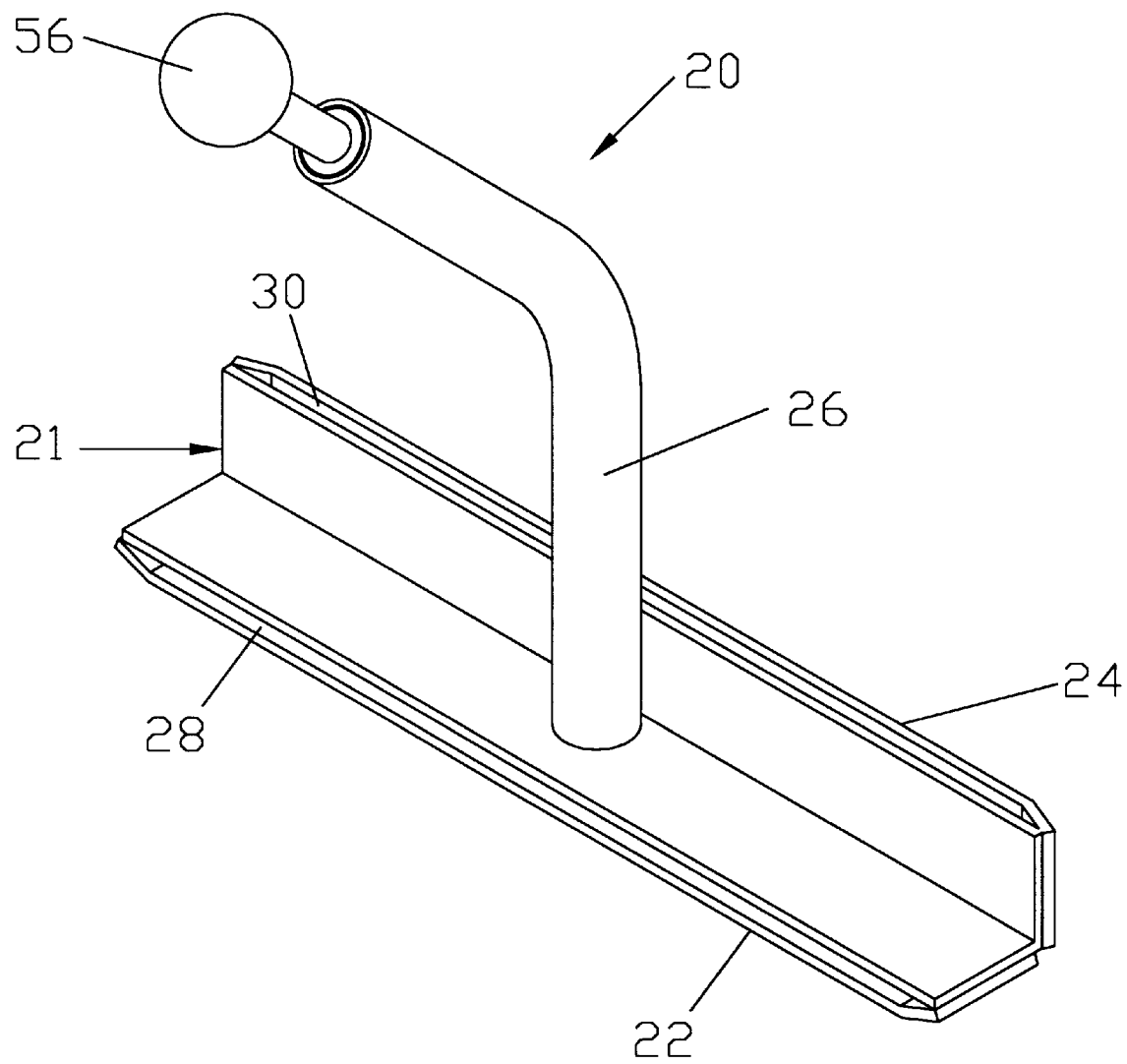
FIG. 2 is a perspective view of the embodiment of FIG. 1.

As best seen in FIG. 2, an adaptor 20 comprises a support piece 21, a first slot 22, a second slot 24 mounted at right angles to first slot 22, and a tow bar 26. Each slot 22 or 24 includes an open end 28 or 30 which slips over a load bearing platform 12 of a dolly or hand truck 10. Tow bar 26 is mounted on top of first slot 22 and extending in the same direction as second slot 24. Preferably, tow bar 26 extends upwardly and away from second slot 24 at an angle from the top of first slot 22.

Figure 3:
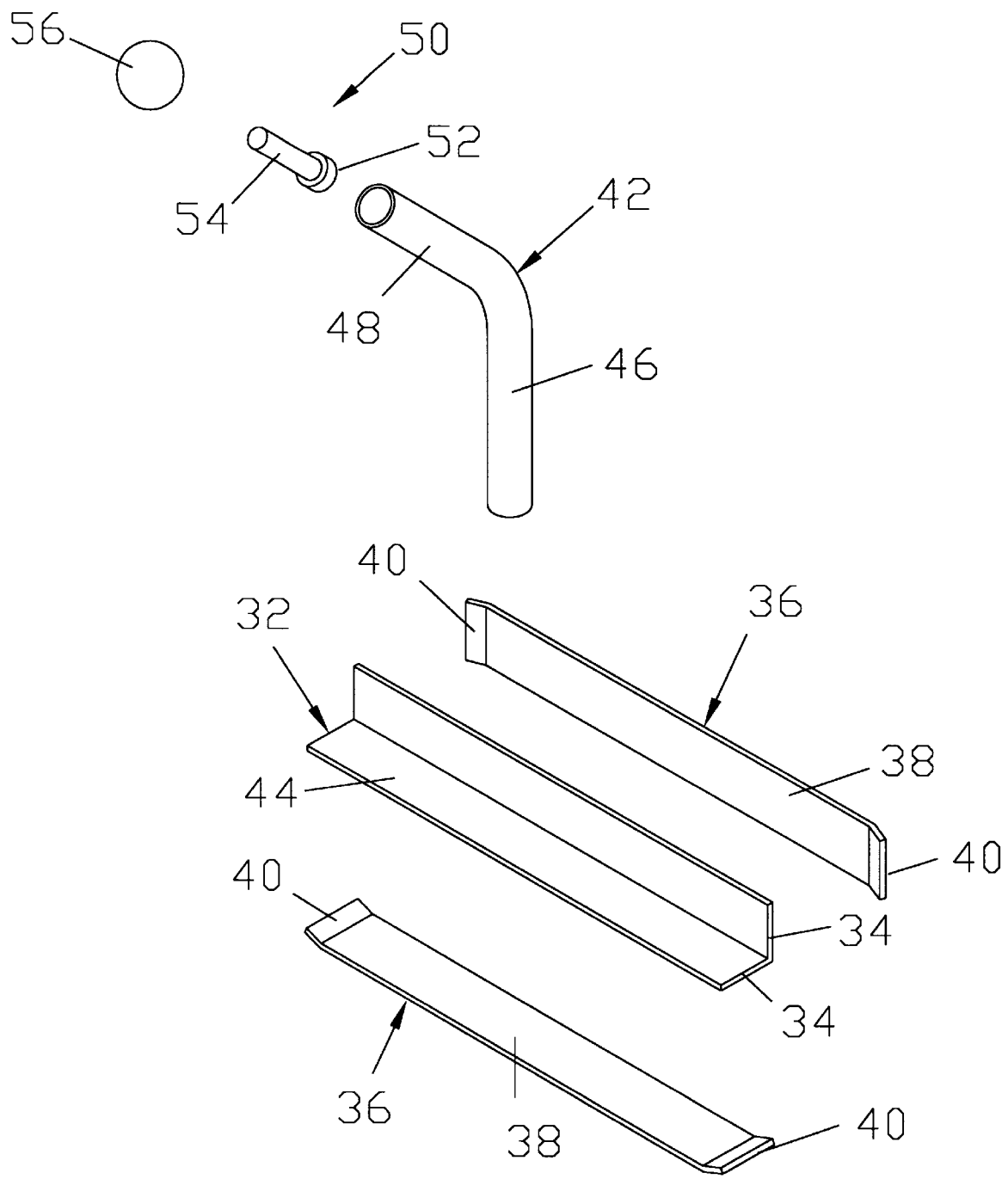
FIG. 3 is an exploded view of the embodiment of FIG. 1.

Turning now to FIG. 3, in the presently preferred embodiment, first slot 22 and second slot 24 are formed from an angle piece 32 having an appropriate length dependent upon the with of a hand trucks platform 12. Those skilled in the art will recognize that a width of about fifteen inches will accommodate most hand trucks though speciality hand trucks (i.e. an appliance hand truck is about twenty four inches) may require more or less.

Permanently mounted to an outside surface 34 of angle piece 32 are two elongated U-shaped pieces 36. Each piece 36 has a base 38 whose length and width correspond to the outside 34 of the angle piece. Shoulders 40 extend from the ends of base 38 towards outside 34 and provide the points at which piece 36 is mounted, preferably by welding, to outside 34. Shoulders 40 provide the separation between angle piece 32 and base 38 to create open ends 28 and 30 as well as the interior of slots 22 and 24. Those skilled in the art will recognize that pieces 36 could be replaced by two angles essentially comprising shoulders 40 and the ends of base 38 proximate to shoulders 40.

The tow bar comprises an angled pipe 42 which is mounted on an inside surface 44 corresponding to slot 22. A lower portion 46 of angled pipe 42 extends upwardly and along the direction of second slot 24. An upper portion 48 of angled pipe 42 bends away from second slot 24, forming an angle with lower portion 46. In the illustrated embodiment, the angle is about 45 degrees. However, those skilled in the art will recognize that other angles would be workable and appropriate. A pin 50 includes a base portion 52 which is preferable inserted into and welded to the inside of upper portion 48 of angled pipe 42. A narrower pin portion 54 extends away from base portion 52. Mounted to the top of pin portion 54 is a ball mount 56.

Figure 1:
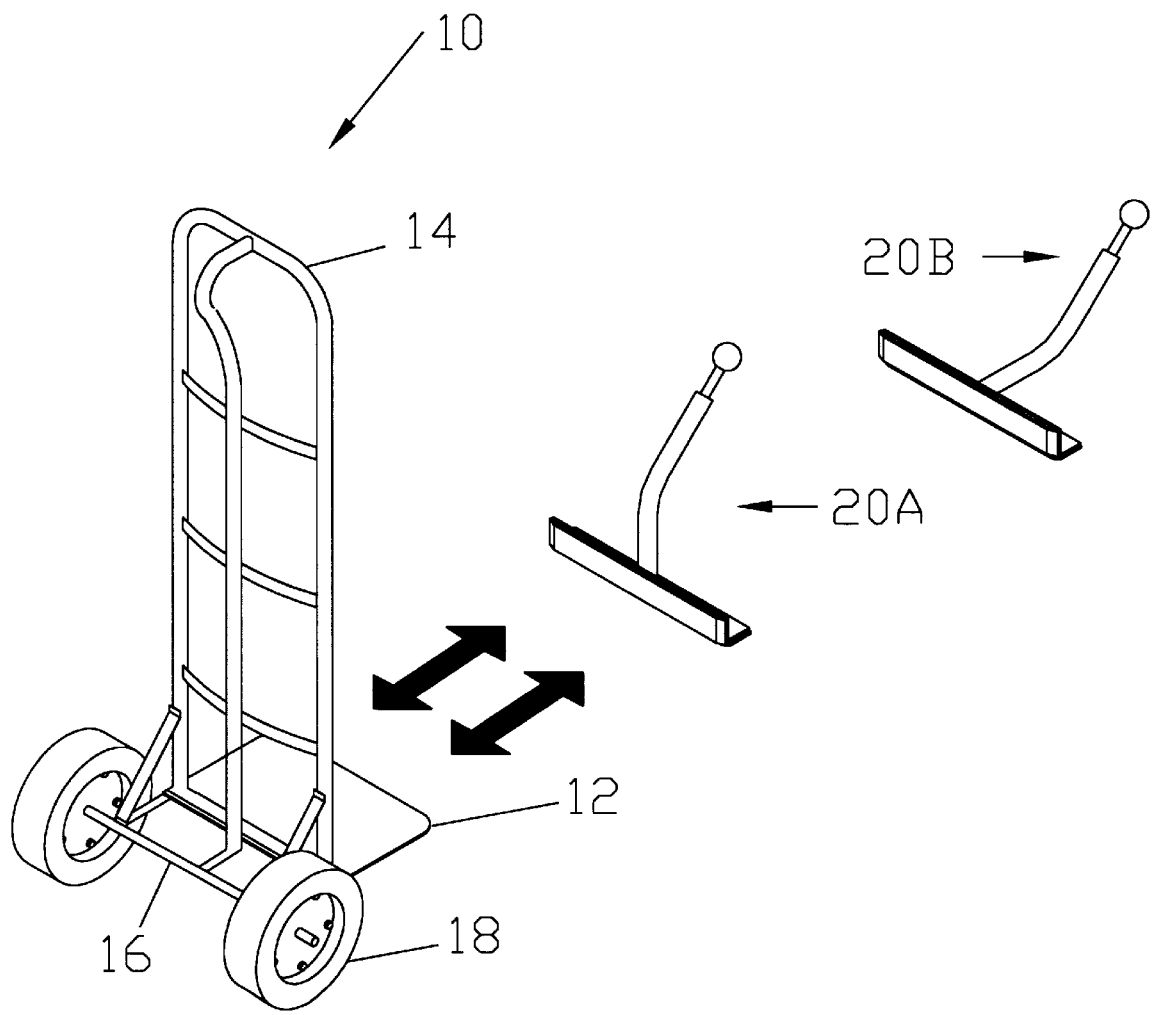
FIG. 1 is a perspective view of a hand truck showing two methods of mounting one embodiment of the present invention thereon.
Figure 4A:
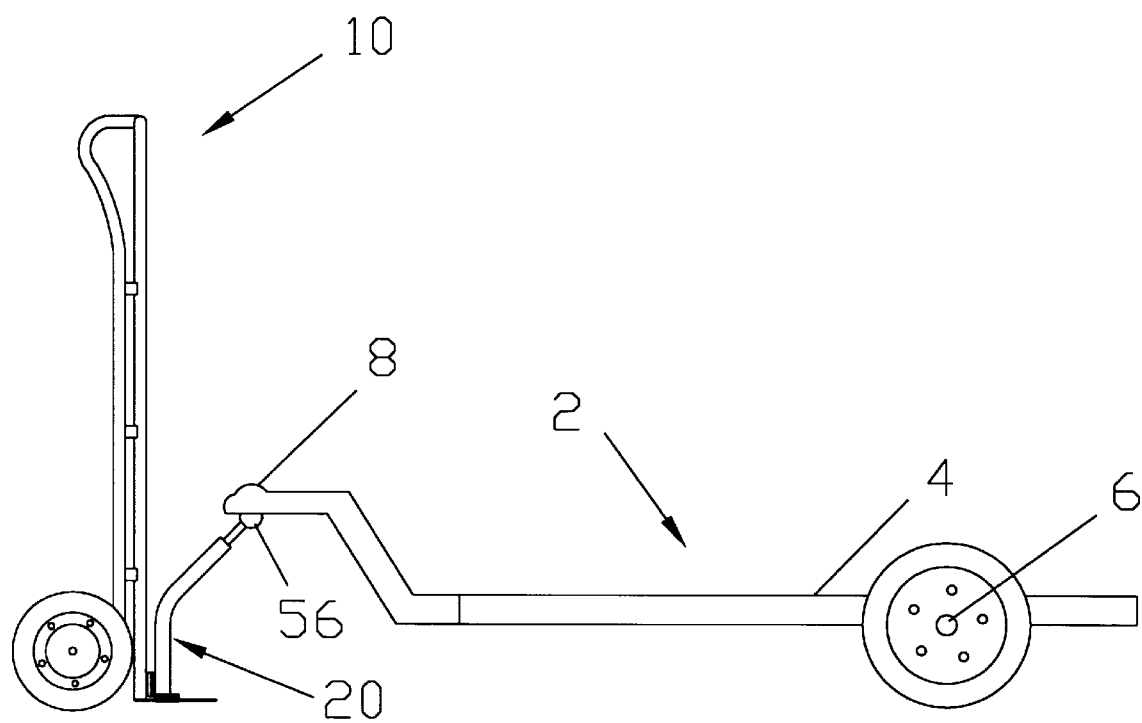
FIGS. 4A–C are side views showing use of the present invention on a trailer.
Figure 4B:
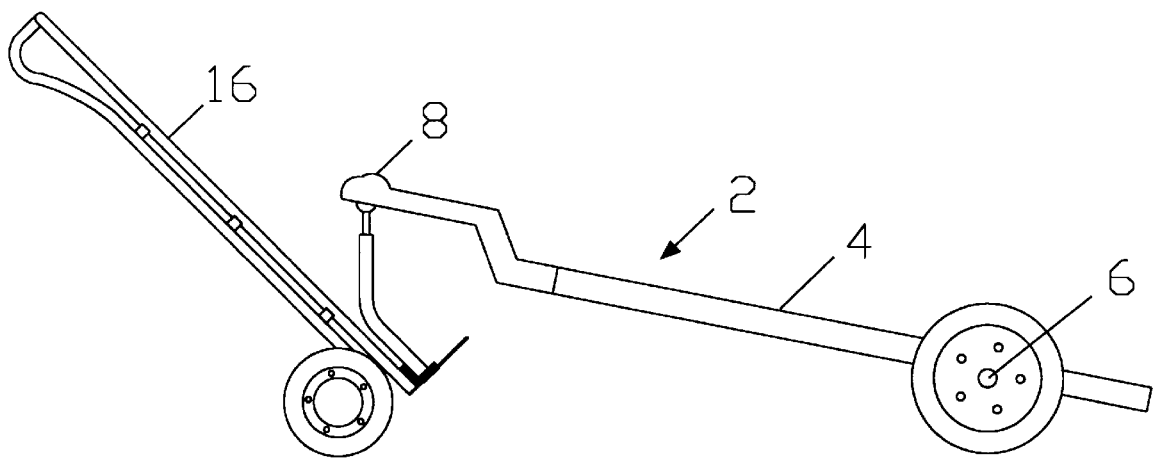
Figure 4C:
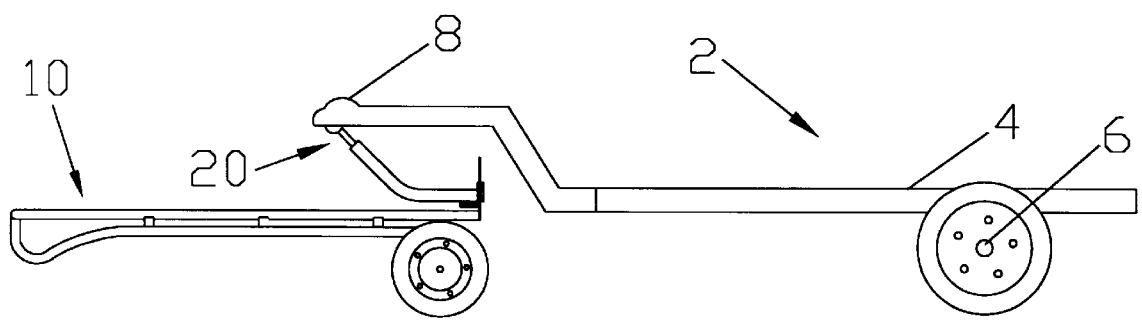

Returning to FIG. 1, adaptor position 20A is prepared for use in connection with a trailer 2 which does not have a jack stand 9 located directly behind coupler 8. As best seen in FIGS. 4A–4C, first slot 22 of adaptor 20 is slid over platform 12. Lower portion 46 is parallel to frame 14 while upper portion extends away from frame 14. Ball mount 56 is facing away from hand truck 10. Preferably, ball mount 56 is a standard sized ball mount though, of course, other specialty sizes could be employed without departing from the scope of the invention.

As shown in FIG. 4A, ball mount 56 is positioned directly underneath coupler 8 of trailer 2. When hand truck 10 is pivoted about axle 16 by a user employing frame 14, ball mount 56 engages coupler 8 and lifts that end of trailer 2 upwardly. In the moving position best seen in FIG. 4B, hand truck 10 is tilted away from trailer 2, ball mount 56 fully engages coupler 8 and trailer 2 can easily be moved about by a user using the leverage provided by hand truck 10. In a last position shown in FIG. 4C, hand truck 10 is in a prone position and trailer 2, via coupler 8 and ball mount 56 rests securely thereon. This position is useful to hold trailer 2 without disengaging the hand truck if desired, as, for example, to move a motor vehicle into position for towing. Additionally, the prone position of hand truck 10 is an easier and safer way to overcome the tongue weight of trailer 2 when engaging or disengaging coupler 8 and ball mount 56. A review of the physics shows in FIG. 4C that the tongue weight of trailer 2 is transferred from coupler 8 to ball mount 56 and is directly over axle 16 of hand truck 10. In this position, hand truck 10 can be rotated about axle 16 to the desired maneuvering position without the leveraged tongue weight to overcome as in FIGS. 4A, 4B, 5A and 5B.

Figure 5A:
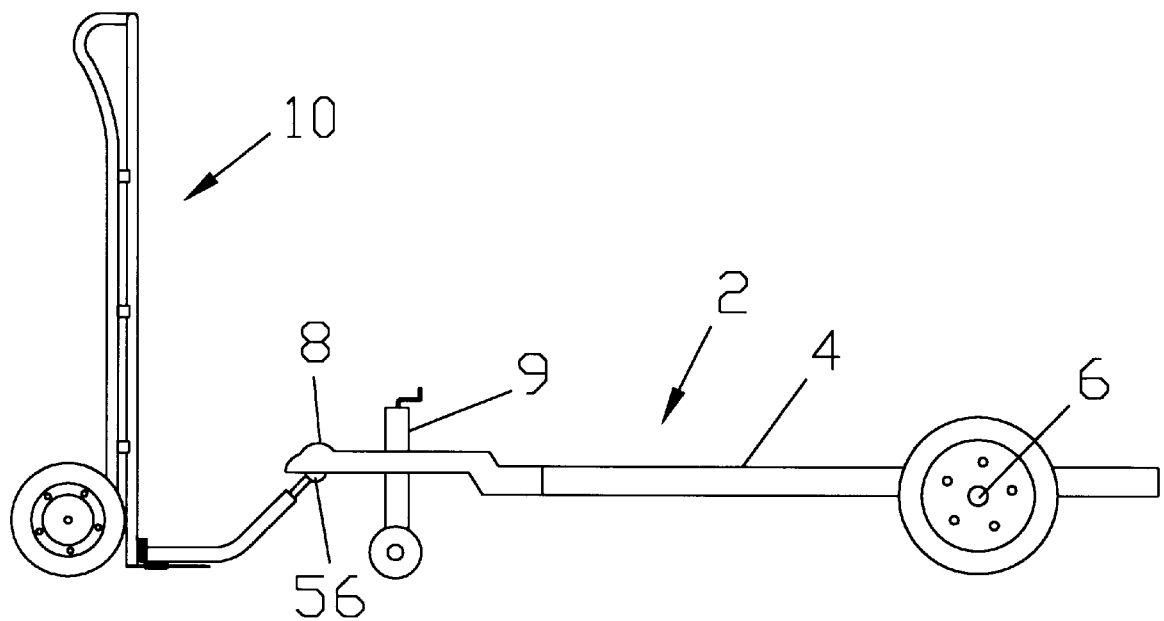
FIGS. 5A–B are side views showing use of the present invention on a jack stand equipped trailer.
Figure 5B:
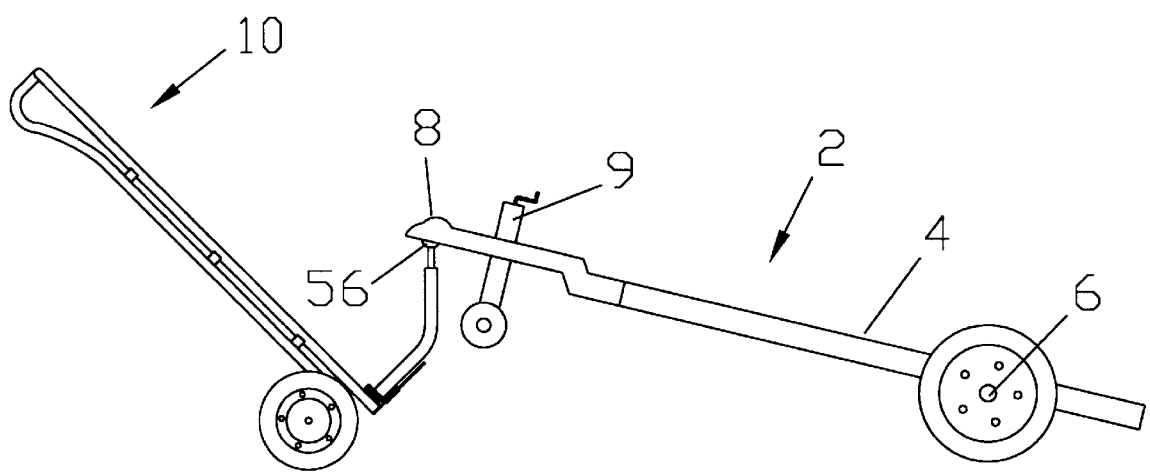

Returning to FIG. 1, adaptor position 20B is simply adaptor 20 prepared for use in connection with a trailer 2 which does have a jack stand 9. When jack stand 9 is positioned proximate to coupler 8 and extends upwardly and downwardly therefrom, a review of the geometry shows that jack stand 9 prevents use of adaptor position 20A since the downwardly extending portion thereof would hit platform 12. To prevent this problem, as best seen in FIG. 5A–5B, second slot 24 of adaptor 20 is slid over platform 12 as previously described in connection with FIGS. 5A–5C. However, in this embodiment, lower portion 46 is parallel to platform 12 while upper portion 48 extends forwardly and upwardly therefrom.

As shown in FIG. 5A, ball mount 56 is positioned directly underneath coupler 8 of trailer 2. When hand truck 10 is pivoted about axle 16 by a user employing frame 14, ball mount 56 engages coupler 8 and lifts that end of trailer 2 upwardly. In the moving position best seen in FIG. 5B, hand truck 10 is tilted away from trailer 2, ball mount 56 fully engages coupler 8 and trailer 2 can easily be moved about by a user using the leverage provided by hand truck 10.

Although only certain embodiments have been illustrated and described, it will be apparent to those skilled in the art that various changes and modifications may be made therein without departing from the spirit of the invention or from the scope of the appended claims.

What is claimed is:

1. An adaptor for use in connection with a hand truck to engage a trailer comprises:

an angle piece, the adaptor further comprising two slots, each slot being mounted on two outside surfaces of the angle piece, the slots having an open end adapted to engage a load bearing platform of a hand truck, a tow bar mounted on top of one of said slots, the tow bar extending upwardly along the direction of the other of said slots and forwardly at an angle from the angle piece, the tow bar including means adapted to engage a coupler on a trailer.

2. The adaptor of claim 1 wherein the tow bar extends upwardly and away from the other of the slots at about an angle of forty five degrees.

3. An adaptor for use in connection with a hand truck to engage a trailer comprises:

an right angle piece having inside surfaces and outside surfaces, two slots, each slot having an open end adapted to engage a load bearing platform of a hand truck, each slot being mounted on one of the outside surfaces of the right angle piece, a tow bar mounted on one of the inside surfaces of the angle piece, the tow bar having a lower portion extending upwardly parallel to the other of the inside surfaces of the angle piece and an upper portion which extends forwardly and away from the other of the inside surfaces of the angle piece at approximately a forty five degree angle, the tow bar including a ball mount to engage a coupler on a trailer.

* * * * *